United States Patent
Friggstad

[11] Patent Number: 5,957,219
[45] Date of Patent: Sep. 28, 1999

[54] AGRICULTURAL ADJUSTABLE CLOSING TOOL FOR USE WITH A CUTTING IMPLEMENT

[75] Inventor: Douglas W. Friggstad, Saskatoon, Canada

[73] Assignee: Flexi-Coil, Ltd., Saskatchewan, Canada

[21] Appl. No.: 08/972,297

[22] Filed: Nov. 18, 1997

[51] Int. Cl.[6] ...................................................... A01C 5/00
[52] U.S. Cl. ............................ 172/395; 172/753; 111/194
[58] Field of Search .................................... 172/395, 744, 172/753; 111/194

[56] References Cited

U.S. PATENT DOCUMENTS

| | | | |
|---|---|---|---|
| 1,500,367 | 7/1924 | Caughey | 172/744 X |
| 4,408,551 | 10/1983 | Keller et al. | 111/194 X |
| 4,423,788 | 1/1984 | Robinson, Jr. et al. | 111/164 X |
| 4,483,401 | 11/1984 | Robertson | 172/744 X |
| 4,986,200 | 1/1991 | Johnston | 111/121 X |
| 5,255,617 | 10/1993 | Williams et al. | 172/744 X |
| 5,452,768 | 9/1995 | Koberlein | 111/140 X |
| 5,609,114 | 3/1997 | Barton | 111/167 |
| 5,724,902 | 3/1998 | Janelle et al. | 111/194 X |
| 5,787,994 | 8/1998 | Friesen | 172/753 X |

Primary Examiner—Christopher J. Novosad
Attorney, Agent, or Firm—Griffin, Butler, Whisenhunt & Szipl, LLP

[57] ABSTRACT

A system for opening and closing ground has a coulter blade for cutting and opening the ground at a first angle to create an angled furrow, and a closing wheel for following the coulter blade for closing the ground. The closing wheel is inclined relative to the ground and engages the ground at a second different angle. The closing wheel is adjustable in height relative to the coulter blade at a plurality of heights. In use, in all adjustable positions the angles and the relative position of the coulter blade and the closing wheel are maintained such that the closing wheel engages the ground substantially in the line of travel of the coulter and closes the furrow cut by the latter.

36 Claims, 6 Drawing Sheets

AGRICULTURAL ADJUSTABLE CLOSING TOOL FOR USE WITH A CUTTING IMPLEMENT

FIELD OF THE INVENTION

This invention relates generally to agricultural implements and more particularly to a means for opening the soil for example for seeding and subsequently closing the soil, for example after seeding, especially for such implements adapted to form angled furrows.

BACKGROUND OF THE INVENTION

Numerous depth gauge means are known. For example, U.S. Pat. No. 4,986,200 in the name of Johnston entitled Depth Gauge Wheel is directed to a wheel removably securable to a coulter disc to control the cutting depth of the disc, wherein the wheel is formed of a high density plastic to which soil and debris are said not to adhere. Another U.S. Pat. No. 4,423,788 in the name of Robinson et al. discloses an agricultural furrow forming apparatus depth control.

A more recently issued U.S. Pat. No. 5,452,768 in the name of Korberlein, assigned to Worksaver, Inc. of Litchfield Ill. discloses a tillage implement to be pulled behind a tractor having a conventional frame with one or more furrowing elements depending from the frame or plough share. Each furrowing element has a disc-like coulter, a shank, and a replaceable plough share mounted on the soil engaging end of the shank. One or more gauge wheels can be adjusted to vary the height of the implement from the soil so as to adjust the depth of the tillage extending down from the frame.

U.S. Pat. No. 5,609,114 to Barton describes an apparatus for agricultural seeding, the apparatus having a rotating coulter disk that is inclined both with respect to the vertical and the horizontal, and a furrow-closing packer wheel that is also inclined with respect to the vertical and the horizontal, the vertical inclination angle being in the opposite direction than the respective angle of the coulter disk.

Although many of these devices appear to perform their intended function, there is a need for an easy-to-adjust depth adjustment mechanism that will enable the positioning of the coulter blade, or another ground-opening, furrow forming element relative to the closing element or another associated ground engaging element.

It is therefore an object of the invention to provide an improved depth adjustment mechanism for an agricultural implement including an opener element (hereinafter termed simply "opener" for brevity) coupled with a ground surface engaging element, e.g. a closing element, the depth adjustment mechanism linked to the opener and to the ground surface engaging element (hereinafter abbreviated as GSE element), wherein the height of the GSE element can be adjusted relative to the opener to control the relative height, typically also the cutting depth, of the opener while maintaining a predetermined angle between the coulter element and the GSE element, the height adjustment being accomplished with a substantially linear motion.

Preferably, for reasons explained hereinbelow, the GSE element is a ground closing element, but it can also be another element.

In accordance with the invention, there is provided, generally, a seeding or fertilizing implement intended to be moved in a line of travel, comprising:

a frame, an opener extending from the frame, said opener defining a verticalmost axis, a seed or fertilizer delivery mechanism disposed substantially behind the opener in the line of travel, a GSE element disposed substantially in the line of travel behind the delivery mechanism, and a tool adjustment mechanism linked to the opener and to the GSE element for adjusting the relative height between the opener and the GSE element.

The tool adjustment mechanism comprises a first arm linked with the opener, a second arm linked with the GSE element, the first arm and the second arm having each an engaging surface matching each other, and a releasable locking means for biasing the engaging surfaces together such as to immobilize, or lock the surfaces during operation.

The engaging surfaces when not biased to each other, are substantially linearly movable relative to each other in a plane substantially parallel to the verticalmost axis of the opener, whereby the opener and the GSE element remain at a substantially constant angle throughout depth adjustments of the mechanism.

Advantageously, the implement in accordance with the invention provides a closing element, e.g. a closing wheel, that is adjustable in height relative to the opener, e.g. a coulter wheel, in a plurality of positions, without the use of tools, while substantially maintaining a predetermined angle between the coulter wheel and the closing wheel. Furthermore, at any height adjustment, the coulter wheel and closing wheel are maintained in relative position such that the closing wheel (or closing element) substantially follows the line of travel of the coulter wheel.

In an embodiment of the invention, there is provided an agricultural implement having a support frame, a rotatable coulter blade or wheel and a rotatable closing wheel depending from the support frame and forming a predetermined angle between the blade and the wheel, the predetermined angle being substantially constant as the closing wheel and coulter blade or wheel are relatively height-adjusted; the closing wheel being rotatable on an axle depending from a member having a lower arm and an upper arm, the lower arm depending from the upper arm at an elbow, the upper arm having means for engaging with complementary engaging means on or attached to the support frame, and means for bringing together said engaging and complementary means into a releasable locking engagement.

In accordance with the invention, there is further provided, a system for opening and closing ground comprising an opener, e.g. a coulter wheel, for cutting and opening the ground at a first predetermined angle, and a GSE element ,for example a closing element for following the coulter wheel for closing the ground, the GSE element engaging the ground at a second predetermined angle, the GSE element being adjustable in height relative to the coulter wheel, with the GSE element being adjusted at a plurality of adjustable heights, while in use, substantially maintaining the angles and maintaining the coulter wheel and GSE element in a relative position such that the portions of the wheels engaging the ground traverse a substantially same location, or in other words, the closing wheel engages the ground substantially in the line of travel of the coulter wheel such that the GSE element engages the ground substantially where the coulter wheel has cut the ground.

In yet another aspect of the invention, the implement may comprise two openers and a tool adjustment mechanism as defined above, the mechanism linked to both the openers for setting a relative height, or vertical position, between the openers. In such a case, the geometric relationship as described herein would apply correspondingly to said openers, i.e. the tool adjustment mechanism is provided to allow one of the openers to move parallel to the verticalmost axis of the other opener.

In one embodiment, the invention provides a depth adjustment mechanism having a first arm linked with the opener, a second arm linked with the GSE element, said first arm and said second arm having each an engaging surface matching each other, and a releasable locking means for biasing said engaging surfaces together such as to immobilize them during operation. The height of the GSE element relative to the opener may be adjusted by positioning a lever such that the wheel is movable into a plurality of positions for controlling the depth of the opener coupled therewith. When the GSE element is moved, the relative angle between the opener and GSE element is maintained and more importantly the closing wheel traverses the same location at a predetermined complementary angle that allows the open soil to be closed by the GSE element.

BRIEF DESCRIPTION OF THE DRAWINGS

Exemplary embodiments of the invention will now be described in conjunction with the drawings, in which.

DETAILED DESCRIPTION OF THE INVENTION

Figure 1:
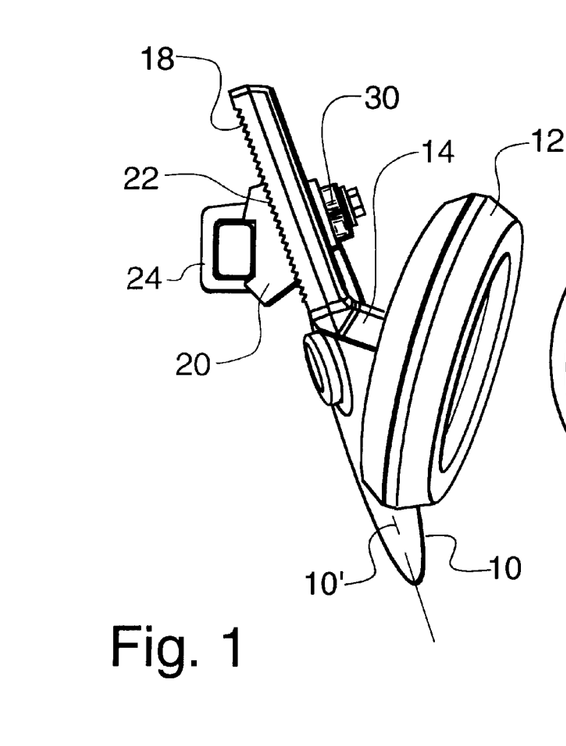
FIG. 1 is a rear view of a system including a coulter wheel shown in front of a closing wheel.
Figure 2:
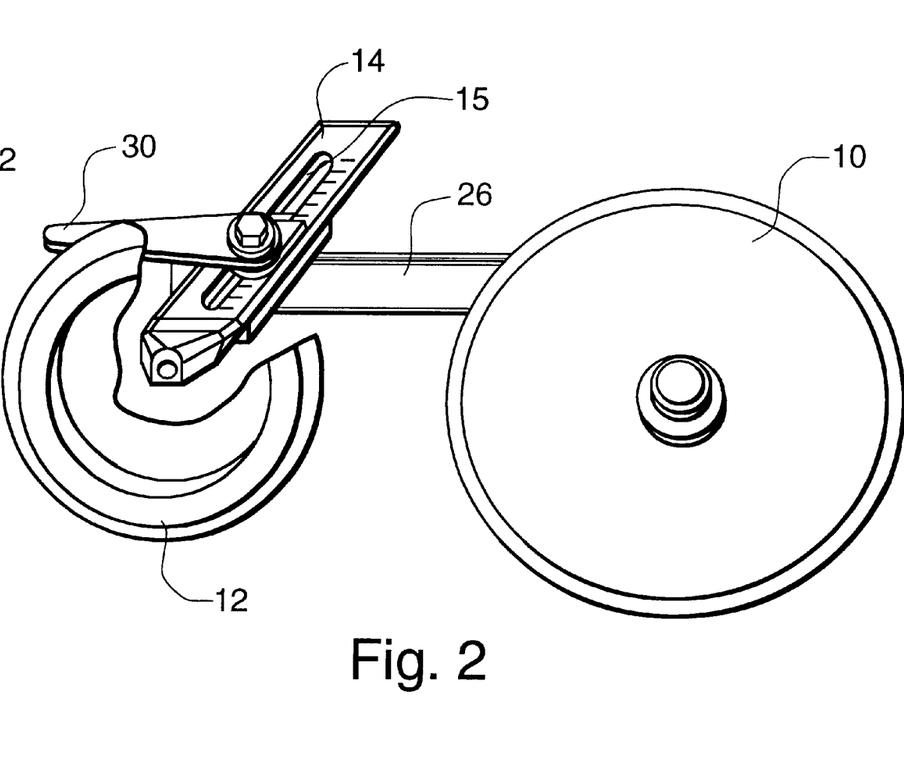
FIG. 2 is a side view of the system shown in FIG. 1.
Figure 3:
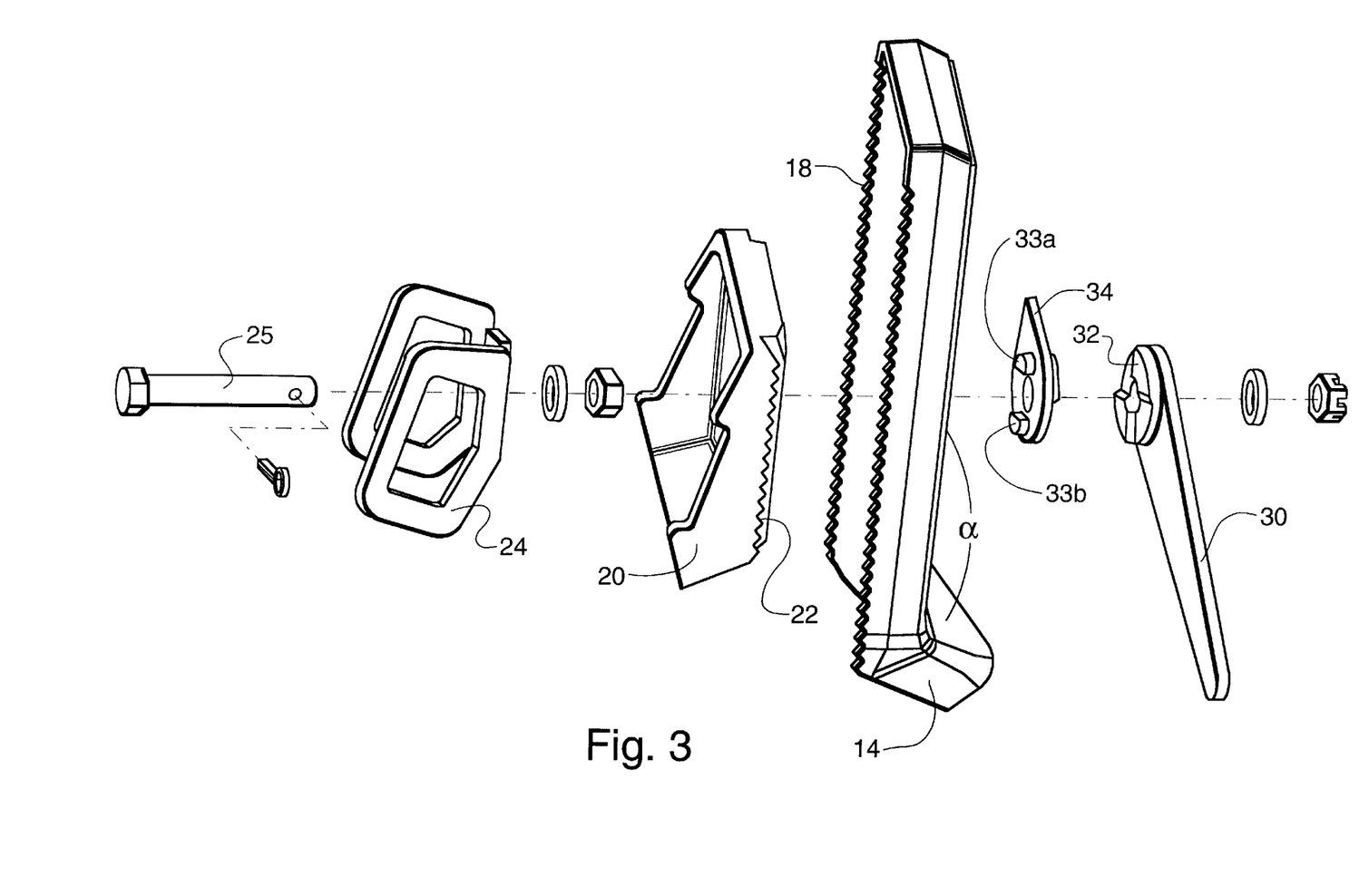
FIG. 3 is a detailed exploded view of a wheel mounting assembly in accordance with the invention.
Figure 4:
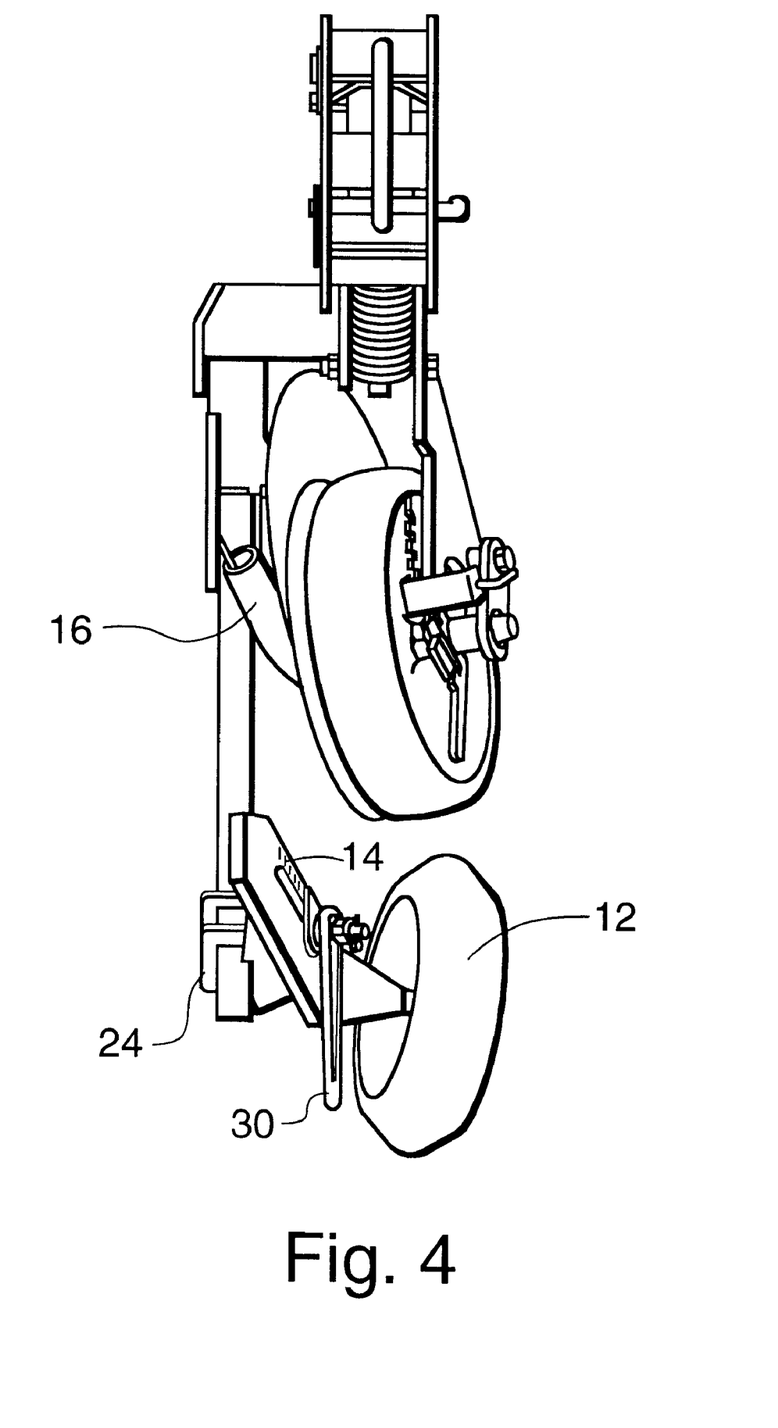
FIG. 4 is a detailed top view of an alternative embodiment of no-till opener in accordance with the invention.
Figure 5:
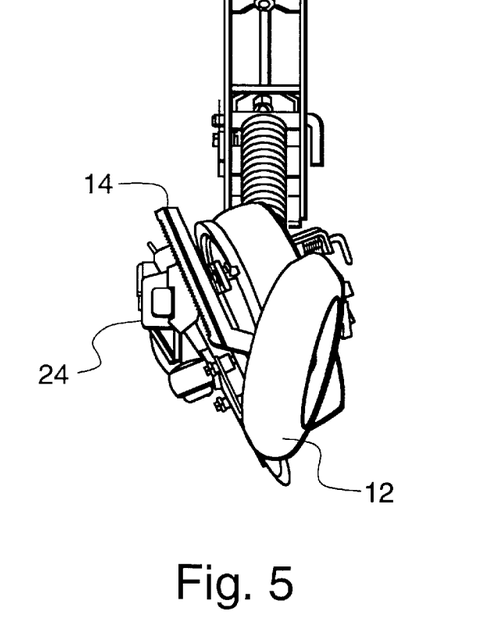
FIG. 5 is a detailed perspective view of the no-till opener shown in FIG. 4 in accordance with this invention.
Figure 6:
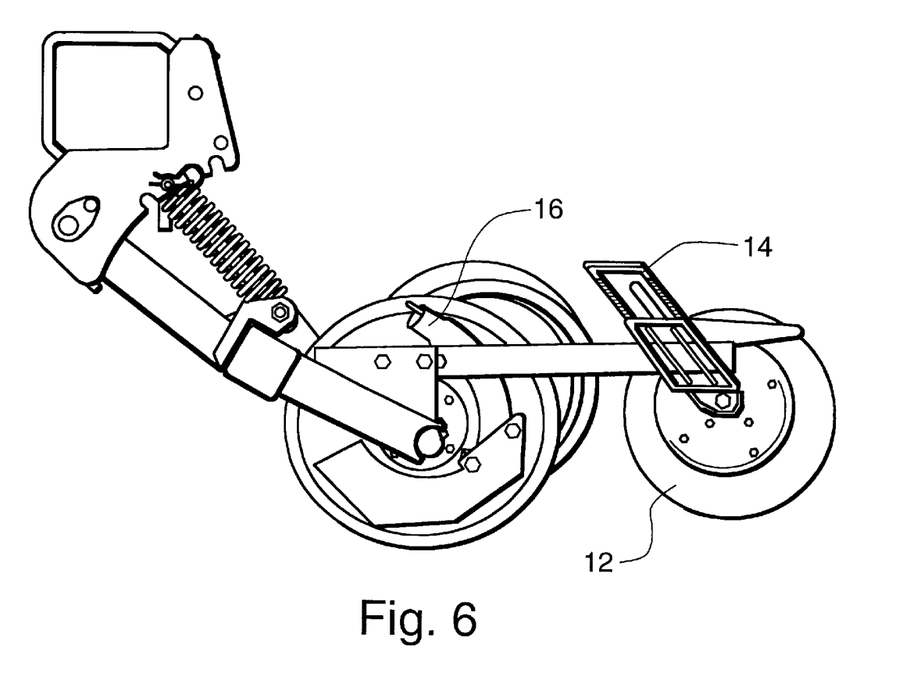
FIG. 6 is a detailed side view of the no-till opener shown in FIG. 4 in accordance with this invention.

Turning now to FIGS. 1, 2 and 3, a system is shown having a coulter wheel 10 coupled with a generally v-shaped closing wheel 12. The coulter wheel, as shown in FIGS. 1, 5 and 6 is set at a first angle to the vertical and at a second angle to the horizontal, or the line of travel. The angles are defined in the above-cited Barton U.S. Pat. No. 5,609,114 the specification of which is incorporated herewith by reference. The closing wheel, which is also, as described in Barton, supra, set at an angle to the vertical and at another angle to the horizontal, is rotatably mounted on a substantially L-shaped closing wheel arm 14, wherein the L is a lazy-L having an angle α greater than 90 degrees. A backside of the L-shaped arm 14 includes a stair-like toothed surface 18 for mating with complementary toothed surface 22 on a wheel mounting bracket 20. A mounting bracket 24 is bolted to the wheel mounting bracket 20 which is used to couple the closing wheel 12 with the coulter wheel 10 by a connecting member 26. A seed or fertilizer delivery mechanism 16 seen clearly in FIG. 6, is disposed substantially behind said opener in the line of travel. A detailed exploded view of elements is shown in FIG. 3. The coulter wheel 10 and the closing wheel 12 are coupled through a frame F shown in FIG. 8. The frame F is equivalent to the element 26 of FIG. 2.

Referring now to FIG. 3, a handle 30 with a cammed or helical pad 32 on one side is shown adjacent to a pointer plate 34 having guide tabs 33a and 33b. A mounting pin 25 with a cotter and a nut engages the handle 30 to hold the assembly (20, 24, 30, 34) together. In use, the helical surface 32 when the handle is in a locking position presses against the pointer plate and then against the closing wheel arm to force the arm into engagement with the wheel mounting bracket, wherein the two complementary sets of teeth engage one another. When the handle 30 is rotated into an unlocked position, the teeth are allowed to disengage and the wheel at the end of the closing wheel arm can be adjusted by being lowered or raised. As will be described in greater detail later, this adjustment is easily made wherein a slot 15 within an upper portion of the L-shaped arm 14 only allows the wheel mounting bracket to slide therealong until a desired height is reached. The wheel is then locked into a fixed position by turning the handle 30 to a locked position. Advantageously, no separate adjustment is necessary to control lateral movement of the closing wheel 12.

The placement of the closing wheel in relation to the angled coulter wheel into one of a plurality of positions along a substantially linear path defined by the toothed surfaces 18, 22 is important to the performance of this system. The closing wheel is used both to close the furrow and as a gauge wheel to control the depth of penetration of the coulter. Conveniently, the staircase depth adjustment mechanism positions the closing wheel both laterally and vertically with a single adjustment. No tools are required to adjust the height of the closing wheel. A depth scale is provided on the L-shaped arm 14 and the pointer plate points to the current depth. The scale allows all of the soil openers to be set for a same depth, or allows particular different settings to be selected.

The staircase surface 18 of the L-shaped arm 14 is a serrated interface between the closing arm 14 and the wheel-mounting bracket 20 that is fixed at an angle from the vertical axis. When tightened, by positioning the handle in the locked position, the arm and the bracket interlock to hold the wheel 12 in place. The toothed surfaces 18, 22 are released by turning the handle mechanism. The helical pad between the handle and the pointer plate is such that the whole mechanism is loose along the axis of the mounting pin 25 with the handle 14 in one position, allowing sliding between the serrated pieces, and tightly locked when the handle is turned. The figures show the handle in the locked position when horizontal and unlocked when rotated to vertical.

The guide tabs 33a, 33b on the pointer plate maintain it in relation to the slot 15 in the closing wheel arm 14. When the handle is pivoted to release the helical pad 32, the closing wheel arm 14 can be slid vertically until the desired depth is reached. Due to the angle of the interface surface the wheel moves laterally as well. The arm is then placed in the locked position to tighten the mechanism and prevent further sliding.

Figure 7:
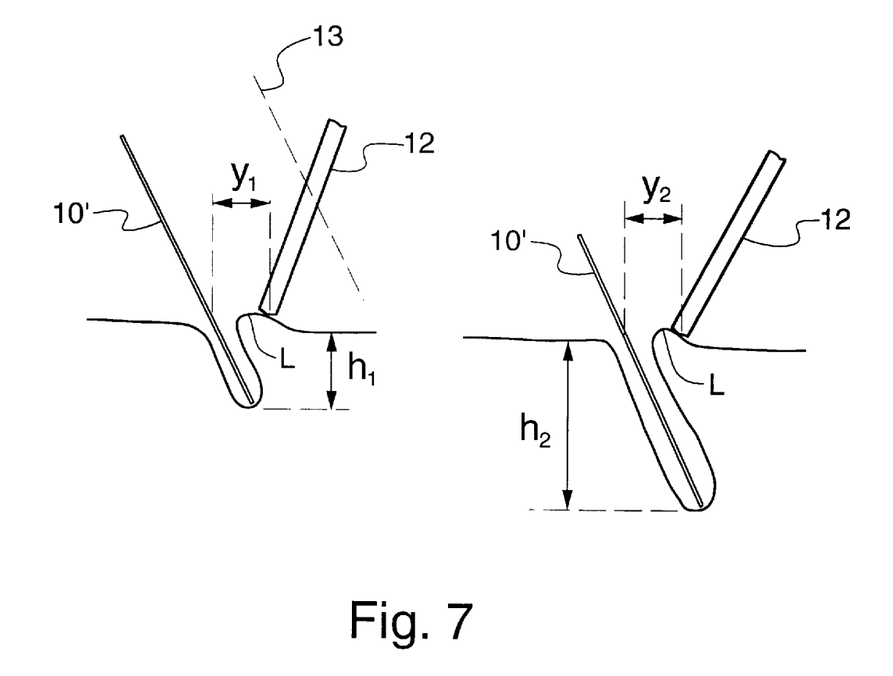
FIG. 7 is a schematic representation of the relative position of the coulter blade and the closing element during height adjustment.

FIG. 7 illustrates, in front view, the relative movement of the closing wheel and the coulter blade during height adjustment. The left part of FIG. 7 shows the coulter wheel 10 in the furrow to a depth $H_1$. The right part of FIG. 7 shows the coulter wheel 10 inserted to a depth $H_2$. In both cases (and generally in all depth adjustment positions of the mechanism), the closing wheel 12 is disposed at the same angle relative to the coulter wheel and its lower tip is spaced at the same distance $y_1=y_2$ from the furrow created by the wheel 10. It is known that the distance should be substantially the same regardless of the height adjustment so that the closing wheel rides over the lip L of the furrow and closes the furrow effectively.

To achieve this geometric relationship, the movement of the closing wheel 12 relative to the coulter wheel 10 should be effected along the dashed line 13 which is substantially parallel to the verticalmost axis 10' of the coulter wheel 10. This is also illustrated in FIG. 1. It will be seen that the general plane of the toothed surface 18 and the surface 22 is parallel to the axis 10' of the coulter wheel 10 which itself is angled relative to the above-said general plane. The verticalmost axis is of course inclined to the vertical as the coulter wheel is tilted to achieve an angled furrow. In the embodiment illustrated, the "verticalmost axis" of the coulter wheel is the line running through the uppermost point, center and the lowermost point of the coulter wheel when in use.

It will also be seen in FIG. 7 that the verticalmost axis 10' of the opener 10 (the axis is easy to define when the opener constitutes a wheel, but somewhat difficult to define when the blade is a knife) is meant to represent the overall, or median, profile of the furrow created by the blade. This is evident when one recognizes that, as described in the Barton U.S. Pat. No. 5,609,114, the coulter blade is practically always toed in relative to the line of travel to push the walls of the furrow away from each other; the walls of the furrow are then somewhat angled to each other, and the plane of symmetry of the furrow is parallel to the verticalmost axis of the blade (i.e. coulter wheel in the embodiment illustrated).

Figure 8:
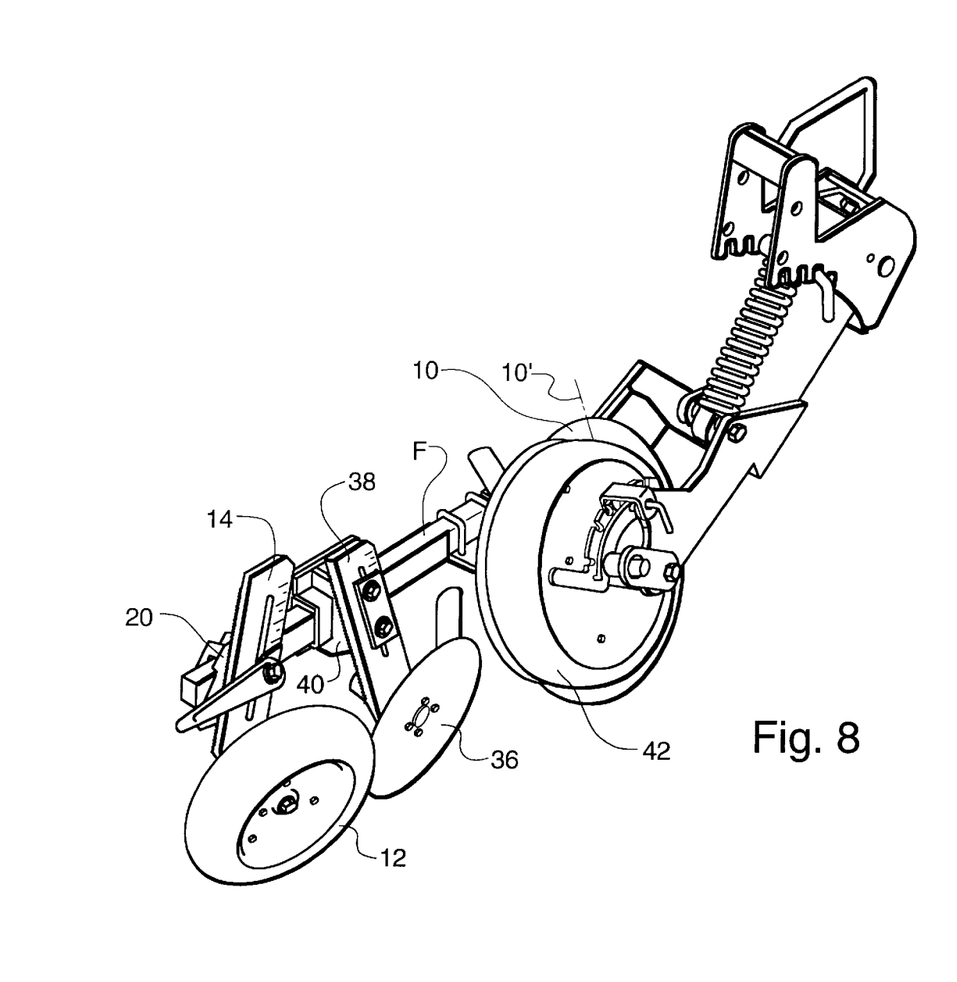
FIG. 8 is another embodiment of the invention wherein the implement has at least one additional tool as is shown in FIGS. 4 to 6.

FIG. 8 illustrates an embodiment of the invention wherein the implement has, apart from the main furrow opener (coulter blade) 10 and the closing element 12, a second furrow opener 36, all coupled through a common frame F (similar to item 26 in FIG. 2). The second opener 36 has again a depth adjustment mechanism similar to that illustrated in FIG. 3, the arms 14 and 20 being now referenced as 38 and 40 respectively, with the exception of the lever 30 being replaced by a pair of bolts. The arms 14 and 20 lie in the same plane as the arms 38 and 40, respectively, however this is not clear when viewing FIG. 8. The depth adjustment mechanism of the second opener serves to adjust its height with relation to the first opener wheel 10. When the bolts are released, the arm 38 is movable relative to the arm 40 in a plane parallel to the verticalmost axis 10' of the coulter blade 10. The movement is also in a direction parallel to the axis 10' due to the angle of mounting of the arm 38 on the frame F. It will again be noted that the plane parallel to the verticalmost axis of the first coulter blade 10 is substantially the median plane of the furrow cut by the coulter blade 10.

The above-described arrangement, with two openers, reflects a so-called double-shoot implement. Such implement is useful to create a second furrow which is cut within a wall of the first furrow and is vertically spaced therefrom as described in the Barton patent, supra, so that fertilizer can be deposited in the lower furrow and seeds can be placed in the upper furrow. The second, higher furrow is cut in the wall of the first furrow. During the cutting of the second furrow, some soil is removed and dropped to the bottom of the deeper furrow thereby covering the fertilizer which may have been deposited therein. It is evidently important that the placement of the second opener must be constrained relative to the placement of the first opener (and thus the angle of the first, deeper furrow), otherwise the second furrow will not be formed in the proper part of the first furrow and consequently, either the seed will be too close or spaced too far from the fertilizer.

It will be noted that the plane of the second coulter wheel 36 is not parallel to the plane of the first wheel 10 for the purpose of the double-shoot embodiment. As shown in FIG. 8, the GSE element is a closing wheel 12.

Of course, a plurality of other ground opening and closing tools may be attached to the implement in a similar manner, using the depth adjustment mechanism of the invention.

A key advantage to the mechanism is that the operator does not have to be concerned with the correct lateral placement of the closing or the second opener wheel. The lateral placement is preset at whichever depth the closing wheel is placed. This also improves the angled coulter performance since the lateral positioning is not susceptible to operator error.

Of course, numerous other embodiments may be envisaged, without departing from the spirit and scope of the invention. For example, many types of engaging surfaces of the respective arms of the coulter and the closing element are feasible, with each surface having a plurality of recesses and matching protrusions, teeth, other known engaging elements etc. or simply friction-enhancing features.

I claim:

1. A seeding or fertilizing implement intended to be moved in a line of travel, comprising:

a frame, a ground opener extending from said frame, said opener being oriented along a first axis, a seed or fertilizer delivery mechanism disposed substantially behind said opener in the line of travel, a ground surface engaging element disposed substantially in said line of travel, and a tool adjustment mechanism linked to said opener and to said ground surface engaging element for adjusting the relative height between said opener and said ground surface engaging element, said tool adjusting mechanism comprising a first arm linked with said opener, a second arm linked with said ground surface engaging element, said first arm and said second arm each having an engaging surface formed with a plurality of teeth oriented to be matching each other, said engaging surfaces being oriented in a plane generally parallel to said first axis, and a releasable locking means for biasing said engaging surfaces together so as to immobilize them during operation, said engaging surfaces when not biased to each other, being substantially linearly movable relative to each other in said plane substantially parallel to said first axis of said opener, whereby said opener and said ground surface engaging element remain at a substantially constant angle throughout depth adjustments of said mechanism.

2. The implement according to claim 1 wherein said engaging surfaces each have a plurality of protrusions and matching recesses.

3. The implement according to claim 2 wherein each of said engaging surfaces include a plurality of teeth.

4. The implement according to claim 1 wherein at least one of said engaging surfaces has a guide for assuring the linear relative movement of said engaging surfaces.

5. The implement according to claim 1 wherein said releasable locking means are quick-release locking means.

6. The implement according to claim 1 wherein said releasable locking means comprise a pin extending through said engaging surfaces and a lever adapted to engage said pin and to optionally tighten said surfaces into a locked position or to loosen said surfaces into an unlocked position wherein said ground surface engaging element can be moved relative to said opener.

7. The implement according to claim 6 wherein said releasable locking means comprises a cammed member for tightening said engaging surfaces together.

8. The implement according to claim 6 wherein said releasable locking means comprises a cammed member for tightening said engaging surfaces together.

9. The implement according to claim 1 wherein said opener comprises a rotatable wheel.

10. The implement according to claim 9 wherein said wheel is inclined at a first angle to the vertical.

11. The implement according to claim 9 wherein said wheel is inclined at a second angle to the line of travel.

12. The seeding or fertilizing implement as defined in claim 1, further comprising depth indicating means for indicating the depth of said opener when the ground surface engaging element is locked in place.

13. The seeding or fertilizing implement as defined in claim 12, wherein said depth means is in the form of a pointer plate.

14. The seeding or fertilizing implement as defined in claim 1, wherein the second arm of said ground surface engaging element is substantially L-shaped and defines an upper leg and a lower leg, a back side of the upper leg having said plurality of teeth for engaging with said corresponding plurality of teeth of the engaging surface of said first arm.

15. The seeding or fertilizing implement as defined in claim 1 wherein the verticalmost axis is non-vertical.

16. A seeding or fertilizing implement intended to be moved in a line of travel, comprising:
   a frame,
   a first opener extending from said frame, said opener being oriented along a first axis,
   a seed or fertilizer delivery mechanism disposed substantially behind said first opener in the line of travel,
   a second opener extending from said frame, and
   a depth adjustment mechanism linked to said second opener and to said first opener for adjusting the relative height between said second opener and said first opener,
   said depth adjustment mechanism comprising
   a first arm linked to said first opener,
   a second arm linked with said second opener,
   said first arm and said second arm each having an engaging surface formed with a plurality of teeth oriented to be matching each other, and
   a releasable locking means for biasing said engaging surfaces together so as to immobilize the surfaces during operation,
   said engaging surfaces when not biased to each other, being substantially linearly movable relative to each other in said plane substantially parallel to said first axis of said opener.

17. The implement of claim 16 further comprising a ground surface engaging element disposed substantially in the line of travel.

18. The implement according to claim 16 wherein said engaging surfaces have each a plurality of protrusions and matching recesses.

19. The implement according to claim 18 wherein each of said engaging surfaces include a plurality of teeth.

20. The implement according to claim 16 wherein at least one of said engaging surfaces has a guide for assuring a linear relative movement of said engaging surfaces.

21. The implement according to claim 16 wherein said releasable locking means comprise a pin extending through said engaging surfaces and a lever adapted to engage said pin and to optionally tighten said surfaces into a locked position or to loosening said surfaces into an unlocked position wherein said second opener can be moved relative to said first opener.

22. The implement according to claim 16 wherein said first opener comprises a rotatable wheel.

23. The implement according to claim 22 wherein said wheel is inclined at a first angle to the vertical.

24. The implement according to claim 22 wherein said wheel is inclined at a second angle to the line of travel.

25. The seeding or fertilizing implement as defined in claim 16, further comprising depth indicating means for indicating the depth of the second opener when the first opener is locked in place.

26. The seeding or fertilizing implement as defined in claim 25, wherein said depth indicating means is in the form of a pointer plate.

27. In an implement for depositing seed or fertilizer into the ground and being movable along a direction of travel, said implement having a frame; a ground opener extending from said frame in a generally vertical direction to create a furrow in the ground; a seed or fertilizer delivery mechanism disposed substantially behind said opener relative to said direction of travel to deposit seed or fertilizer in said furrow; a ground engaging member disposed rearwardly of said opener relative to a direction of travel; and an adjustment mechanism operably associated with said ground engaging member for adjusting the vertical height of said ground engaging member relative to said opener, an improved tool adjustment mechanism comprising:
   a first member supported by said frame and having a first engagement surface formed with a stepped configuration;
   a second member connected to said ground engaging member and having a second engagement surface formed with a mating stepped configuration corresponding to said first engagement surface;
   a locking apparatus for locking said first and second engagement surfaces together in a manner to fix said second member on said first member, said locking apparatus being selectively disengagable to permit the movement of said second member relative to said first member, whereby said ground engaging member can be moved generally vertically relative to said ground opener.

28. The implement of claim 27 wherein said second member can be moved generally linearly along said first member when said locking apparatus is disengaged.

29. The implement of claim 28 wherein said locking apparatus further includes a guide for directing the generally linear movement of said second member relative to said first member.

30. The implement of claim 29 wherein said locking apparatus further includes a pin extending through said first and second members and through said guide, a lever rotatably engagable with said pin, and a cam member cooperable with said lever for selectively urging said second member into engagement with said first member.

31. The implement of claim 28 wherein each of said first and second engagement surfaces include a plurality of teeth defining discrete increments of movement of said second member relative to said first member for vertically adjusting said ground engaging member.

32. The implement of claim 31 wherein said ground opener is supported from said frame at a first angle relative to vertical and said ground engaging member is supported at a second angle relative to vertical, the movement of said second member along said first member effects a vertical adjustment of said without effecting a change in said second angle.

33. The implement of claim 31 further comprising:
   a depth indicating device associated with said locking apparatus to display the vertical orientation of said ground opener relative to said ground engaging member.

34. The implement of claim 33 wherein said depth indicating device is in the form of a pointer plate indicating the relative position of said second member to said first member.

35. The implement of claim 27 further comprising:
   a second ground opener supported from said frame to form a second furrow in the ground; and
   a second tool adjustment mechanism operatively associated with said second ground opener to effect a vertical adjustment of said second ground opener relative to said first ground opener, said second tool adjustment mechanism having:
      a first member supported by said frame and having a first engagement surface formed with a stepped configuration;
      a second member connected to said second ground opener and having a second engagement surface formed with a mating stepped configuration corresponding to said first engagement surface; and
      a locking apparatus for locking said first and second engagement surfaces together in a manner to fix said second member on said first member, said locking apparatus being selectively disengagable to permit the movement of said second member relative to said first member, whereby said second ground opener can be moved generally vertically relative to said ground opener.

36. The implement of claim 35 wherein each of said first and second engagement surfaces of said second tool adjustment mechanism include a plurality of teeth defining discrete increments of movement of said second member relative to said first member for vertically adjusting said ground engaging member.

\* \* \* \* \*